May 21, 1968     D. E. DECKER     3,384,732
INDUCTION ANNEALING OF STRIP JOINTS
Filed Jan. 8, 1964     3 Sheets-Sheet 1

INVENTOR.
DESMOND E. DECKER
BY Francis J. Klempay
ATTORNEY

May 21, 1968 D. E. DECKER 3,384,732
INDUCTION ANNEALING OF STRIP JOINTS
Filed Jan. 8, 1964 3 Sheets-Sheet 2
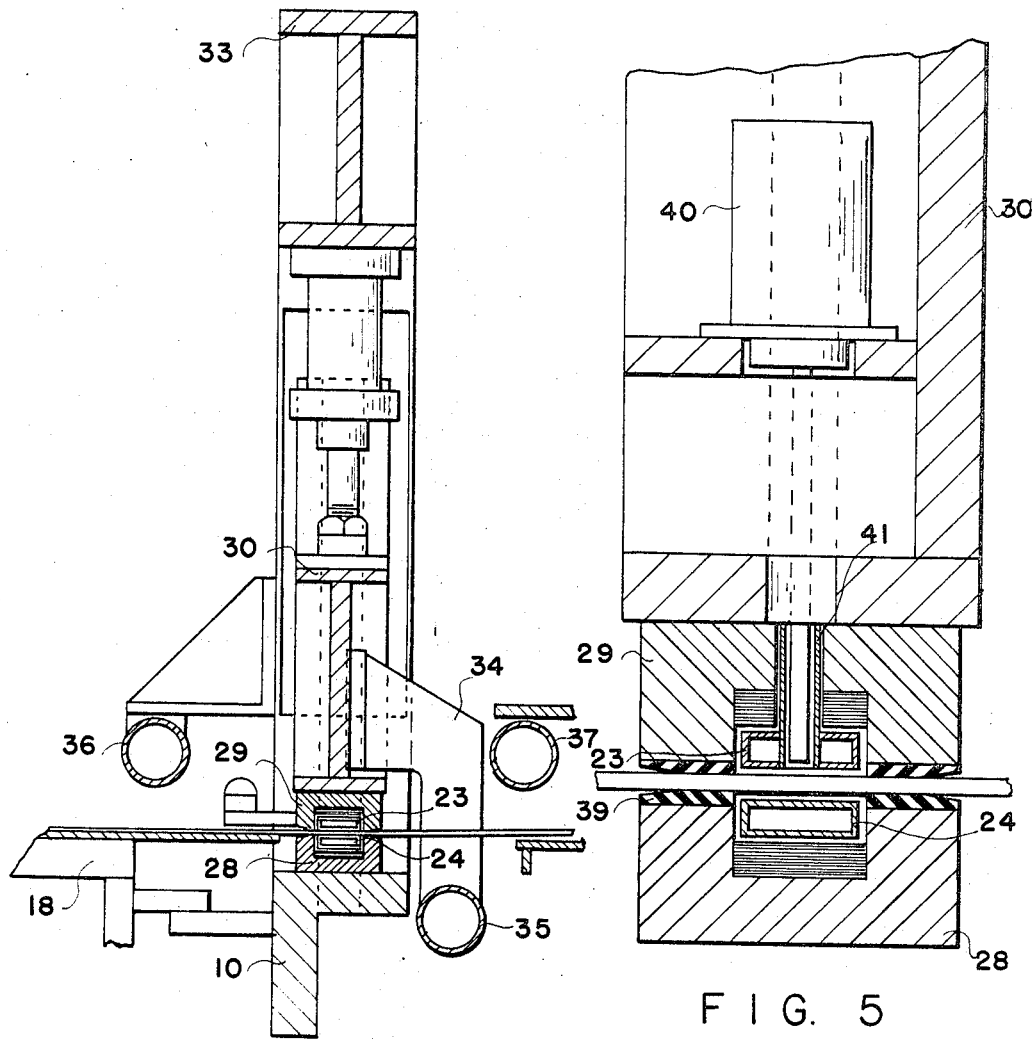
FIG. 5
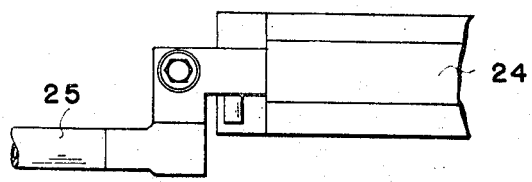
FIG. 2
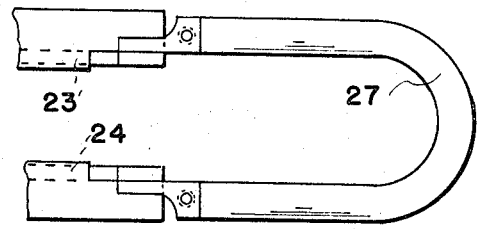
FIG. 7
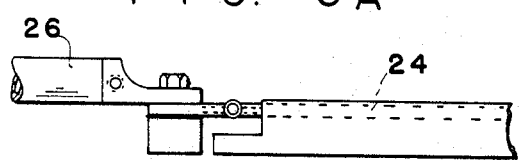
FIG. 6A
FIG. 6B
INVENTOR.
DESMOND E. DECKER
BY Francis J. Klempay
ATTORNEY May 21, 1968　　　　D. E. DECKER　　　　3,384,732
INDUCTION ANNEALING OF STRIP JOINTS
Filed Jan. 8, 1964　　　　　　　　　　　　3 Sheets-Sheet 3

INVENTOR.
DESMOND E. DECKER
BY
*Francis J. Klempay*
ATTORNEY

United States Patent Office 3,384,732
Patented May 21, 1968

3,384,732
INDUCTION ANNEALING OF STRIP JOINTS
Desmond E. Decker, Warren, Ohio, assignor to The Taylor-Winfield Corporation, Warren, Ohio, a corporation of Ohio
Filed Jan. 8, 1964, Ser. No. 337,122
12 Claims. (Cl. 219—97)

ABSTRACT OF THE DISCLOSURE

The present invention relates to the provision of an annealing station in a line for joining metal sheets and strips in end-to-end relationship by resistance welding. The sheet or strip, after welding, is accurately indexed to the annealing position wherein a high frequency inductor of novel construction is used for annealing the weld. The inductor is in the form of a U-shaped loop of hollow, rectangular tubular construction through which cooling fluid may pass, comprising flat leg portions extending above and below the welded strip and a loop or bight portion extending around one side edge of the strip. A pyrometer assembly is also used to detect the annealing temperature.

---

This invention relates to the general art of joining strip in end-to-end relation and more particularly to a method and apparatus for annealing the joints made in the strip by the application of heat and fusion as in resistance welding processes, for example. Certain materials such as alloy and medium and high carbon steels, particularly, become hard and brittle when welded together in wide thin sheets or strip because of the rapid conduction of the welding heat away from the point of weld and this makes the joined material quite prone to crack and break when entrained over handling rolls, and when cold reduced, or when utilized in fabrication processes. It is accordingly desirable to increase the ductility of the welds in most metallic sheet or strip material while the sheets or strip lie flat across the joint in the same plane as the material occupied during the welding process. It is one of the primary objects of the invention to provide a practical method and apparatus for accomplishing this.

It has been heretofore proposed when joining sheets and strip by the electric resistance flash-butt welding process to apply an annealing current in the welding dies immediately after the welding cycle but this method has not proven satisfactory when dealing with wide thin stock because of the impossibility of effecting uniform distribution of the annealing current longitudinally along the joint. It has also been proposed to effect the annealing by means of a hand torch or the use of a muffle furnace but both of these methods are so time-consuming as to be impractical in a modern production line. It is accordingly a further object of the invention to provide a practical apparatus for use in conjunction with sheet and strip welding apparatus to automatically effect the annealing of the welded joints in a uniform consistent manner and in the shortest possible period of time. The time factor is particularly important when the equipment is used to supply continuous strip from successive coil lengths of the stock to a processing or strip utilization line wherein any interruption in the supply of strip is undesired. Normally a strip storage facility is positioned intermediate the strip joining equipment and the strip processing or utilization line and it is, of course, always desirable to limit the spatial requirements of this facility as much as possible.

In accordance with the principles of the present invention there is provided an annealing station consisting essentially of a current conductive loop or other inductor for carrying high frequency induction current to heat the welds of the joints to proper annealing temperatures and by controlling the period and intensity of the current to effect proper annealing of the welds. This station is fixed with respect to the welding station and means are provided to automatically advance the welded strip longitudinally to thereby move the weld line from the welding station to the annealing station. In much of this equipment there are also provided stations to trim off the weld flash both transversely across the faces of the strip and at the ends of the weld lines, and it should be understood that when such ancillary equipment is employed the strip clamping and/or pulling means of the present apparatus will be operative to longitudinally advance the strip in step-by-step relation to move the welds from the welding station to the other stations, including the annealing station, in progression.

Another object of the invention is to provide an operative electric induction annealing station for strip joints which can be readily opened up to permit the strip to run rapidly through the station between cycles of operation thereof without wear or other damage to the components of the station. I have determined that maximum uniformity and speed of annealing is achieved if an inductor is placed over each surface or face of the strip. The two inductors may conveniently form an advantageous loop, and the present invention provides an arrangement whereby the two parallel inductors of this loop may be readily moved apart to permit of the high speed running of strip therebetween and be rapidly brought to closer spaced relation for proper application of the induced heating currents.

A further object of the invention is the provision of a practical and dependable arrangement for incorporating an optical pyrometer in the equipment so that the annealing temperatures attained by the induced currents may be automatically and rapidly monitored during operation of the equipment.

The above and other objects and advantages of the invention will become apparent upon consideration of the following specification and the accompanying drawing wherein there is disclosed a preferred embodiment of the invention.

In the drawing:

FIGURE 2 is a fragmentary longitudinal section of the apparatus of FIGURE 1;

FIGURE 5 is a sectional view of an enlarged scale of a portion of the apparatus shown in FIGURE 2;

Figure 1:
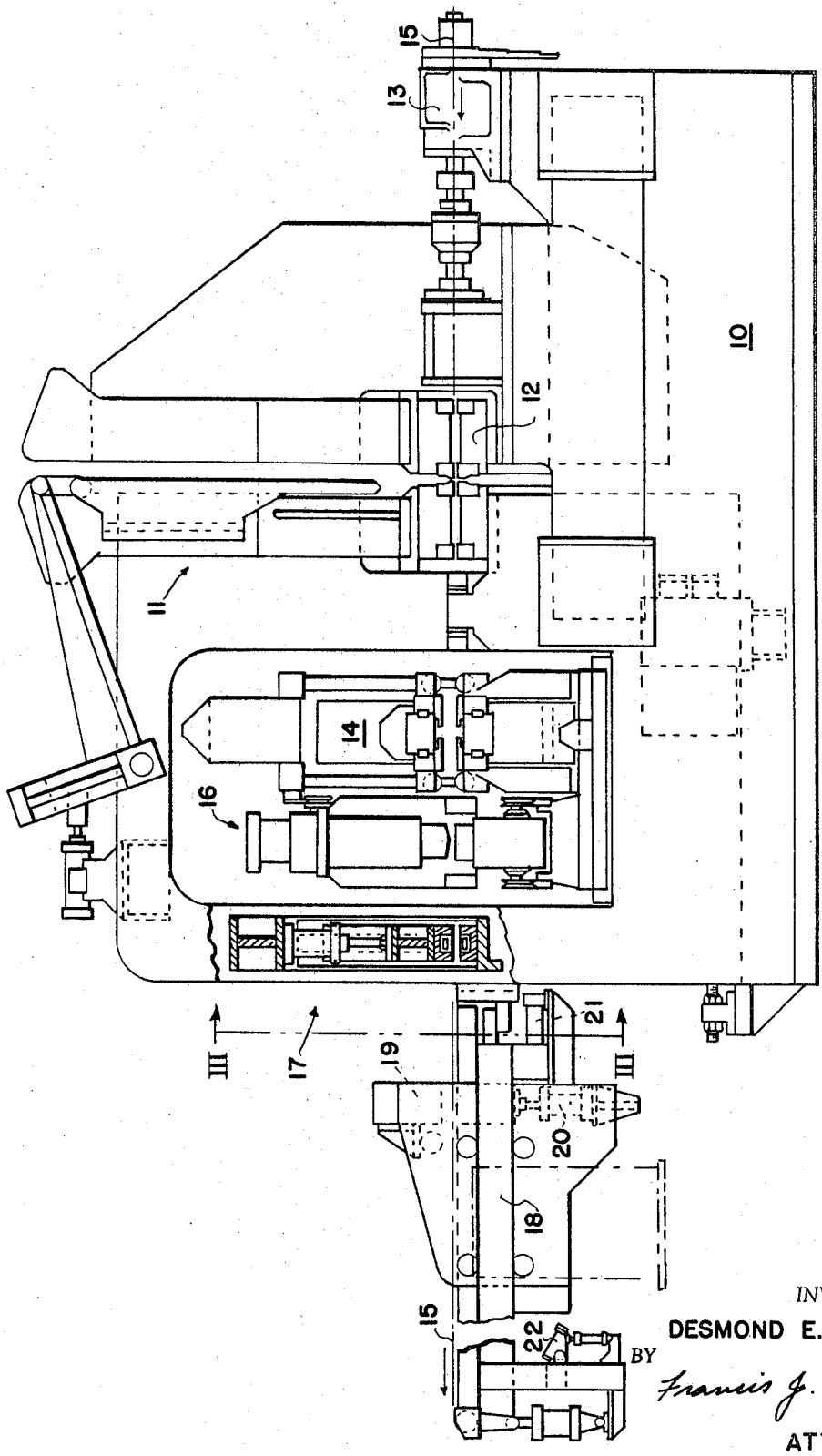
FIGURE 1 is a side elevation, partly in section, of a combined machine for joining strip, utilizing the principles of the present invention.
Figure 4:
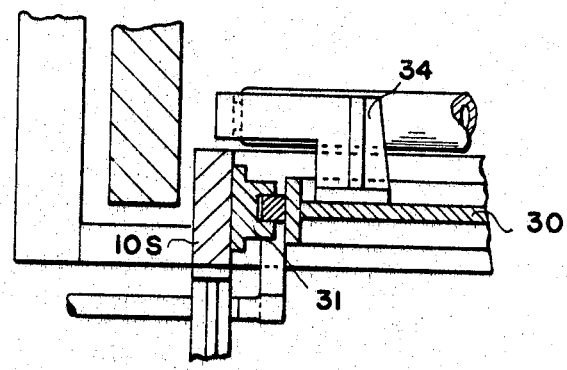
FIGURE 4 is a horizontal section taken along the line IV—IV of FIGURE 3.
Figure 3:
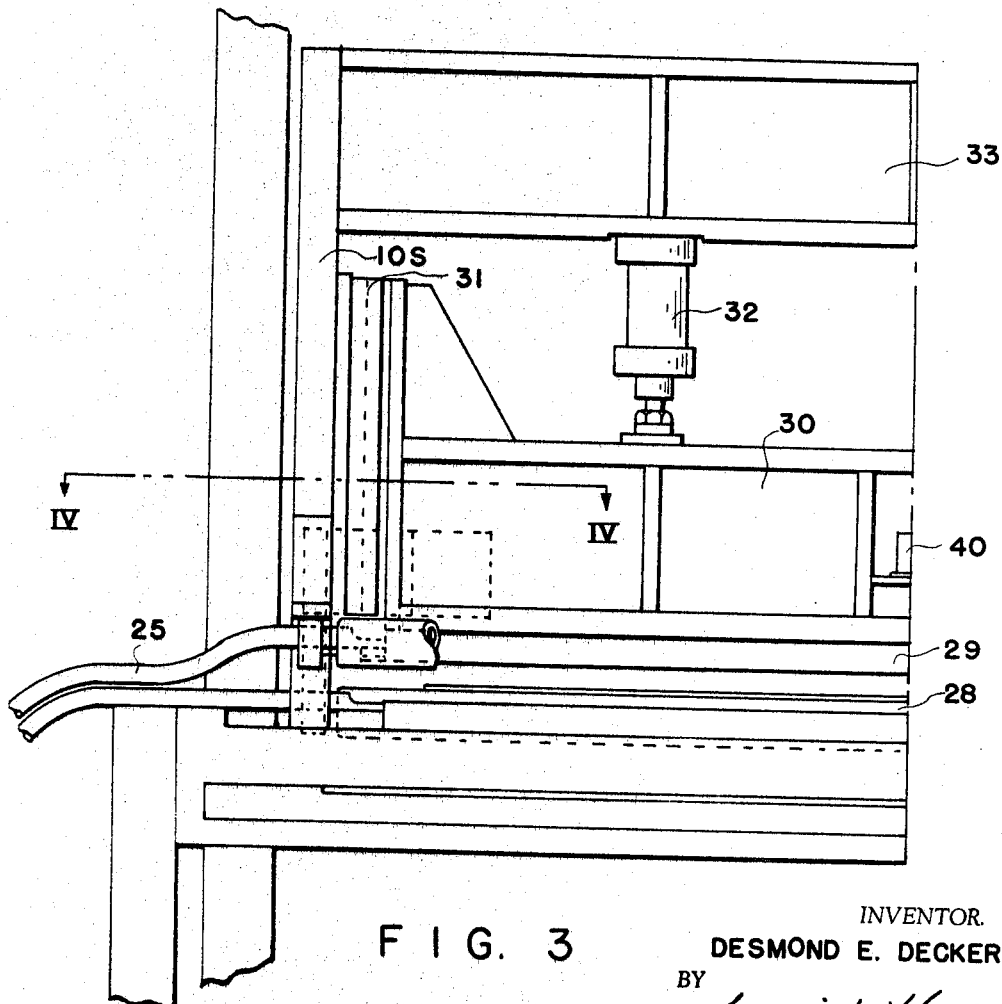
FIGURE 3 is a fragmentary elevation viewed from the plane III—III of FIGURE 1.

FIGUR7 6A is a plan view of a terminal end of one of the conductors of the inductor loop utilized in the apparatus of FIGURE 1;

FIGURE 6B is a side elevation of the apparatus shown in FIGURE 6A; and

FIGURE 7 is a fragmentary elevation of the closed end of the inductor loop utilized in the apparatus of FIGURE 1.

Referring first to FIGURE 1, there is illustrated a combined machine for flash-butt welding strip in end-to-end relation, for trimming the flash from opposite faces of the welded strip, for trimming or notching the side edges of the welded strip at the transverse ends of the weld line, for annealing the weld made in the strip, and for indexing the welded strip longitudinally in step-by-step relation whereby the weld may be transferred in succession from the welding station to the trimming station to the notching station and to the annealing station. Thus, the apparatus comprises a base 10 on which is mounted a fixed welding clamp 11 and a longitudinally slideable welding clamp 12 which is operated by a hydraulic cylinder or cylinders 13 to effect the burn off and upset in the welding process as is well understood in the art. Reference numeral 14 designates a flash trimming station in which draw-cut tools, not particularly shown herein, are used to skive off the flash from both the top and bottom face or surface of the welded strip after the strip is indexed by apparatus to be hereinafter described The pass plane of the strip through the equipment is indicated by reference numeral 15 and the strip enters and runs through the equipment in the direction shown by the arrows.

Reference numeral 16 designates broadly a notching station in which vertically movable shear blades descend to either trim off the laterally projecting flash at the transverse ends of the weld or to cut out small segments of the side edge portions of the strip at the transverse ends of the weld as desired. It should be understood that the inclusion of the trimming and/or notching station is solely for illustration purposes since many strip welders do not include these ancillary devices. The present invention is entirely operative and advantageous without them.

In the present invention, I provide a novel and improved weld annealing station which is indicated generally by the reference numeral 17, which station is on the downstream side of the welder and ancillary equipment, and the apparatus of this station is preferably supported by the frame which stands upwardly from the base 10 of the combined equipment. Outwardly of the annealing station 17 but anchored to the base 10 is a longitudinally disposed track 18 on which is slideably mounted a strip clamp 19 actuated by a cylinder 20, and a second cylinder 21 is provided to advance the clamp 19 and the strip held thereby longitudinally to the left as viewed in FIGURE 1. There is provided an adjustable stop 22 which limits outward travel of the clamp 19 and the operation of the stop 22 is such that when it is in its vertical position the clamp 19 will advance just far enough to move the weld line made in the strip from the welding station 11, 12 to the trimming station 14, and when the stop is in horizontal position it will gauge the movement of the clamp 19 during the next bite on the strip and the accompanying cycle of operation so that the weld line will move from the trimmer 14 to the notching station 16. Also, when the stop 22 is in horizontal position it will gauge the movement of the clamp 19 so that the weld line is drawn from the station 16 to the annealing station 17. The horizontal distance between the welder 11, 12 and trimmer 14 is equal to the horizontal distance between the trimmer and the annealing station so that the notching station 16 may be bypassed in the operation of the combined apparatus, if desired.

By referring now to FIGURES 2 thru 7, it will be observed that the illustrated annealing station comprises a current conductive loop (comprised in part of an upper conductor 23 and a lower conductor 24) which loops about the welded strip from one side thereof, being connected at said side to conductors 25 and 26, respectively, leading to a suitable source of high frequency current, not shown herein. The conductors 23 and 24 are preferably watercooled and are preferably flat as indicated in FIGURES 2 and 5 of the drawing. The fittings which interconnect the conductors 23 and 24 with the conductors 25 and 26, as shown in outline in FIGURES 6A and 6B, are constructed so that cooling water may circulate from and to the conductors 25 and 26. The ends of the conductors 23 and 24 opposite the leads 25 and 26 are interconnected by a flexible current and coolant conductor 27 as shown in FIGURE 7. It should be understood that cooling fluid will circulate in heat-exchanging relation with the conductors 23 and 24 and the jumper 27 in series, and also that the jumper 27 electrically interconnects the adjacent ends of the flat conductors 23 and 24 to provide a current-conductive loop for the flow of the high frequency current applied to inductively heat the weld metal. It should further be understood that the longitudinally movable clamp 19 described above is operative to precisely locate the line of weld in the strip in the center of the transverse interstice between the conductors 23 and 24.

The lower conductor 24 is housed within a groove formed in the upper surface of a lower transverse bar 28 which is carried by a transverse strut of the base and frame structure 10 of the combined equipment. The upper conductor 23 is housed and retained in a groove formed in the lower face of a transversely extending bar 29 which in turn is rigidly connected to and carried by a vertically movable slide 30. Slide 30 is guided in ways 31 provided on the inner faces of side sections 10S of the base frame assembly 10. A double acting cylinder 32 carried by a strut 33 interconnecting the frame sections 10S (one on either side of the machine) is provided to raise and lower the slide 30 and consequently the upper bar 29 as well as the upper conductor 23. Journaled on brackets 34 secured to slide 30 and positioned outside the path of the strip is a roll 35 which upon upward movement of the slide and consequent retraction of the bar 29 raises the strip well above the lower bar 28 thereby permitting the strip to run rapidly through the machine without scraping action against the lower bar. Other transverse rolls 36 and 37 journaled for rotation about axes fixed with respect to the base 10 and the bottom bar 28 protect the upper bar 29 from the rapidly running strip. The bars 28 and 29 are highly heat conductive but nonmagnetic, being made of copper, for example, so that during the annealing process the metal of the strip longitudinally outward of the weld line will not be heated above critical temperatures tending to harden the strip. Insulation pads 39 may be affixed to the faces of the bars 28 and 29 to limit heat transfer and to avoid marking of the strip.

It should be noted particularly that the arrangement of the bars 28, 29 and the conductors 23 and 24 places the conductors in very close proximity to the line of weld in the strip so that the weld metal as well as the metal of the strip which is closely adjacent to the weld metal may be brought to proper annealing temperature in a very short period of time and with a minimum expenditure of electrical energy. Further, since the spacing of the conductors from the weld and the symmetry of the conductors with respect to the weld is always uniform, consistent and improved annealing results are obtained—assuming, of course, that the timing and intensity of the high frequency current are properly regulated. The bars 28 and 29 constitute a clamp which smooths out any transverse and longitudinal waviness which may be in the strip thereby insuring that the conductors 23 and 24 will be uniformly spaced from the weld line throughout their lengths. This insures uniform heating along the weld line.

To assist in controlling and monitoring the annealing cycle, I incorporate in the slide 30 an optical pyrometer shown schematically at 40 located intermediate the side edges of the strip and having a line of sight directly to the weld being annealed. For this latter purpose, I provide a vertical tube 41 which extends down through a bore formed in the bar 29 and also through a vertical aperture formed in the upper conductor 23 as shown in FIGURE 5. Also as shown in this figure the structural element of the slide 30 on which the pyrometer is supported and the lower strut of the slide are apertured to provide a direct line of sight from the pyrometer down through the tube 41 and onto the weld which is positioned centrally with respect to the tube. The pyrometer operates through suitable control circuitry, not included herein, to interrupt or to reduce the supply of high frequency current when the weld has attained proper annealing temperature, all dependent on the material being annealed and the desired schedule of the annealing cycle. As explained above, this cycle is made as short as possible in point of time so that very little time is added to the over-all joining cycle.

It should be appreciated, however, that the more basic principles of the invention may be availed of even though considerable changes are made in the apparatus specifically illustrated herein. For example, the optical pyrometer control may be replaced with more conventional equipment which controls the annealing by means of a timer and/or means which regulates the current flowing through the inductors (23, 24). Also, while the arrangement of having an inductor both above and below the strip is generally preferred it is conceivable that satisfactory results will be obtained if the inductor extends across the strip and returns on the same side. This should be adequate particularly for strip of thin gauges. It should also be understood that the basic precept of the invention would be operative and advantageous even though no trimming or notching devices are utilized in the combination machine. In such case the sliding clamp (19) would transfer the line of weld directly from the welding station to the annealing station. It is common practice in the art to provide separate equipment to remove welding flash, side trim, etc. and, of course, any cutting operation would be facilitated if the weld and the metal of the strip adjacent to the weld were first annealed.

In actual practice, the apparatus described herein is automatically controlled through sequence actuation by control apparatus, not shown, but it should be appreciated that the movable clamp 19 as well as the ancillary working stations used, including the annealing station, all operate in the shortest possible time and without any delay whatever at the completion of the respective indexing movements so that the successive strip joints in the continuous strip being supplied will be suitably finished in the least possible lapse of time.

Having thus described my invention what I claim is:

1. In apparatus for joining strip in end-to-end relation comprising in combination means establishing a longitudinal path of travel for the feeding of strip longitudinally to a strip processing or utilization line, a welding station positioned along said path to weld strip lengths together by heat and fusion, an annealing station positioned along said path on the downstream side of said welding station and operative to anneal the weld made in the strip at said welding station and the metal of the strip adjacent said weld, said annealing station comprising a high frequency inductor of substantially U-shape including flat conductors positioned above and below said path connected together by a curved portion looped about the side of said path of travel of the strip to apply heat by induction to the opposite surfaces of the joined strip, a strip clamp movable longitudinally along said path on the downstream side of said annealing station and being operative to grasp the welded strip and advance the same longitudinally along said path, and power means to advance said strip clamp through a predetermined stroke along said path to move the weld in the strip from said welding station to said annealing station.

2. Apparatus according to claim 1 further including a lower heat conductive bar extending transversely of said path and fixed with respect thereto, said lower bar having a groove in its upper surface to receive the lowermost of said conductors, an upper transverse bar having a groove in its lower surface to receive the uppermost of said conductors, and means to raise and lower said second mentioned bar and the conductor housed therein.

3. A unitary assembly for joining metal strip in end-to-end relation comprising in combination a welding station for joining said strip by heat and fusion, means establishing a path of travel for moving strip longitudinally through and beyond said welding station, an annealing station positioned along said path on the downstream side of said welding station and operative to anneal the weld made at the welding station as well as the metal of the strip adjacent said weld, said annealing station comprising a high frequency inductor of substantially U-shape including flat conductors positioned above and below said path connected together by a curved portion looped about the side of said path of travel of the strip to apply heat by induction to the opposite surfaces of the joined strip, and means positioned along said path on the downstream side of said annealing station to advance the strip longitudinally through a predetermined distance whereby the weld may be automatically advanced from the welding station to the annealing station upon completion of the weld.

4. Apparatus according to claim 3 further characterized in that said inductor loop curved portion comprises a flexible conductor for interconnecting adjacent ends of said conductors, and means to move one of said conductors toward and away from the other of said conductors to permit strip to run longitudinally and freely therebetween intermediate annealing cycles.

5. Apparatus according to claim 4 further including a frame supporting said welding station and said means for establishing a path of travel for the strip, a vertically movable slide supported by and guided on said frame, and said one of said conductors being carried by said slide.

6. Apparatus according to claim 5 further including heat-conductive bars each having a groove for the reception of one of said conductors, one of said bars being carried by said slide and cooperating with the other of said bars to form a strip clamp, and said grooves being formed in the mutually facing surfaces of said bars to thereby expose said conductors to the ilne of weld in the strip when the strip is stopped to position the line of weld therein centrally between the side edges of the bars.

7. Apparatus according to claim 5 further including a roll journaled on said frame and operative to prevent the longitudinally running strip from engaging said uppermost conductor when said slide is retracted, and a second roller journaled by said slide for lifting said strip free and clear of the lowermost conductor when said slide is retracted upwardly.

8. In apparatus for annealing a line of weld formed transversely in a metal strip length, a high frequency inductor comprising a straight elongated hollow tubular conductor adapted to be brought into close parallel proximity with said line of weld, an intermediate walled portion defining an aperture in said conductor, and an optical pyrometer having a line of sight extending through said aperture and impinging on the center line of said line of weld so that the pyrometer may be brought in close proximity to the weld.

9. Apparatus according to claim 8 further characterized in that said conductor is arranged for the passage of a cooling fluid, and a tube received within said aperture to provide said line of sight.

10. In apparatus for annealing a line of weld formed transversely in a metal strip length, a high frequency inductor in the form of a current-conductive loop having top and bottom hollow spaced parallel and elongated conductors to overlie the opposite surfaces of the strip along the line of weld, a flexible hollow conductor interconnecting adjacent ends of said elongated conductors, and means to move said elongated conductors toward and away from each other in spaced parallel relationship to said line of weld.

11. Apparatus according to claim 10 further including a rigid bar extending along each of said elongated conductors and movable with said elongated conductors, and each of said bars having a clamping face extending outwardly from the adjacent elongated conductor whereby strip clamped between said faces will be smoothed out to render uniform the spacing of said elongated conductors from the strip throughout the whole of their lengths.

12. Apparatus for annealing a line of weld formed transversely in a metal strip length comprising an elongated clamp adapted to be forcibly brought onto the surface of the strip in general parallel relation with the line of weld, and an elongated high frequency inductor carried with said clamp, and adapted to be moved thereby in spaced, parallel relationship with said line of weld and brought into close parallel proximity therewith, the arrangement being such that said clamp smooths the strip adjacent the line of weld and thus uniformly spaces the line of weld from the inductor throughout the whole length thereof.

References Cited

UNITED STATES PATENTS

| | | | |
|---|---|---|---|
| 2,897,328 | 7/1959 | Alf et al. | 219—10.61 X |
| 2,916,593 | 12/1959 | Herrick | 219—10.61 |
| 3,124,686 | 3/1964 | Goorissen | 219—10.61 X |
| 3,133,185 | 5/1964 | Alf | 219—10.61 |
| 2,018,380 | 10/1935 | Pfeiffer | 219—104 |
| 2,276,354 | 3/1942 | Trainer | 219—104 X |
| 2,448,008 | 8/1948 | Baker | 219—10.61 |
| 2,453,019 | 11/1948 | King | 219—10.61 |
| 2,499,716 | 3/1950 | Bock | 219—10.79 |
| 2,627,009 | 1/1953 | Corson et al. | 219—104 |
| 2,629,812 | 2/1953 | Hagopian | 219—10.69 |
| 3,063,143 | 11/1962 | Bodine | 219—10.43 |

RICHARD M. WOOD, *Primary Examiner.*

B. A. STEIN, *Assistant Examiner.*